United States Patent [19]

Vadasz Fekete

[11] 4,158,956
[45] Jun. 26, 1979

[54] WAVERIDER BUOY ACCELEROMETER CALIBRATION TESTING DEVICE

[75] Inventor: Amnon M. V. Vadasz Fekete, Caracas, Venezuela

[73] Assignee: Instituto Tecnologico Venezolano del Petroleo, Caracas, Venezuela

[21] Appl. No.: 897,594

[22] Filed: Apr. 19, 1978

[51] Int. Cl.² ............................................. G01P 21/00
[52] U.S. Cl. ..................................................... 73/1 D
[58] Field of Search ................ 73/1 D, 1 DV, 170 A, 73/662–668

[56] References Cited

U.S. PATENT DOCUMENTS

| 2,301,967 | 11/1942 | Nosker et al. | 73/1 D |
| 2,930,230 | 3/1960 | Herrmann | 73/1 D X |
| 3,429,175 | 2/1969 | Real et al. | 73/1 D |

Primary Examiner—James J. Gill
Attorney, Agent, or Firm—Browdy and Neimark

[57] ABSTRACT

A waverider buoy accelerometer calibration testing device comprises a rotatable disk or arm, rigid member engaging the rotatable arm, which translates the rotational motion of the arm into reciprocating rectilinear sinusoidal or simple harmonic motion, a rack, rigidly connected to the rigid member, a series of pinions which translate the reciprocating rectilinear simple harmonic motion of the rack into reciprocating curvilinear simple harmonic motion, and a chain, engaging one of the pinions, which exhibits reciprocating rectilinear simple harmonic motion and to which the waverider buoy accelerometer is attached.

7 Claims, 7 Drawing Figures

WAVERIDER BUOY ACCELEROMETER CALIBRATION TESTING DEVICE

FIELD OF THE INVENTION

The present invention relates to the field of devices used to aid in the calibration of waverider buoy accelerometers.

BACKGROUND OF THE INVENTION

Waverider or wave follower buoys are used to measure the amplitude and frequency of waves. These buoys contain in their interior an accelerometer, a cassette recorder, batteries and the electronics. Once the buoy is anchored in its position, the cassette unit records the wave amplitude signals given by the accelerometer at intervals of one (1) second for about twenty (20) minutes each four (4) hours. The lenghts and intervals of the recording can be varied.

To insure the correctness of the signals given by the accelerometer it is imperitive to calibrate it periodically. For this purpose, it is necessary to induce on the buoy a sinusoidal or simple harmonic motion, and adjust the accelerometer within the buoy until the amplitude signals given by this accelerometer produce the sinusoidal motion. In order to insure that the accelerometer is functioning appropriately for variable amplitudes and frequencies of the sinusoidal motion, it is necessary to calibrate it for several amplitudes and frequencies of such motion, for example, for amplitudes of one (1) to four (4) meters and periods of three (3) to forty (40) seconds.

There are four known methods for testing the calibration of waver rider buoy accelerometers.

1. RUBBER MOORING SHOCK CORD METHOD: This method consists simply in hanging the buoy 32 from a crane using a rubber mooring shock cord 30 (Diameter=3.6 cm, stiffness=60 newtons/m) as is shown in FIG. 1. Using a rope 34 the buoy 32 is pulled down until it barely touches the ground; then the rope 34 is released thus the buoy 32 will start moving. A pointer 31 fixed on the buoy 32 shows the motion on a scale 33. The rubber cord 30 has a spring like characteristic with damping, therefore the waverider buoy 32 will exhibit a damped sinusoidal motion.

This method of calibration is fairly simple and inexpensive; however, there are several disadvantages which are explained as follows:

(a) Due to the rubber cord's 30 own damping characteristics, the motion induced to the waverider buoy 32 is also damped (damped sinusoidal).

(b) The amplitudes that can be induced to the waverider buoy 32 are limited to the length of the rubber cord 30. If the rubber cord 30 is stretched more than its linear elastic limit (tear=500 newtons/cm$^2$), then the motion induced on the Waverider buoy 32 is nonsinusoidal.

(c) In order to increase the frequency of motion induced to the Waverider buoy 32, it is necessary to shorten the length of the rubber cord 30, thus introducing the problem mentioned in (b) above.

(d) Some sort of a crane or tall fixture is needed in order to hook the upper end of the rubber mooring cord 30. The length of the rubber mooring cord 30 used in this method ranges from ten (10) to fifteen (15) meters.

The rubber mooring cord method is not very accurate, due to the damped motion induced on the buoy 32, since for calibration purposes a periodic simple harmonic or sinusoidal motion is needed.

2. SPRINGS METHOD: In this method the Waverider buoy is connected to a counter-balance weight 36 by a non-stretchable steel wire rope 38 as shown in FIG. 2. This steel wire rope 38 is forced to pass on two pulleys 30 (or a large diameter wheel) fixed to the ceiling. The bottom of the Waverider buoy 42 and of the counterbalance weight 36 is connected to the ground by means of springs 44 with the same spring constant. The counterbalance weight 36 has a poiner 46 which indicates on a scale 48 the amplitude of the motion. The starting motion is given to the system manually. The frequency of the damped sinusoidal motion induced to the buoy 42 can easily be changed by adding springs or using springs of different spring constant.

Eventhough this method is fairly simple and is an improvement relative to the Rubber Mooring Shock Cord method, it also presents some disadvantages. These are:

(a) Due to the springs 44 own damping characteristics, the motion induced to the Waverider buoy 42 is also damped (damped sinusoidal).

(b) The amplitude of the motion that can be induced to the waverider buoy 42 is very limited in relation to the size of the rig due to the limitation in the springs 44 lengths. If large amplitudes are desired, then the springs 44 will over-stretch thus surpassing their linear elastic limit, therefore the motion induced to the buoy 42 would be nonsinusoidal and unacceptable.

3. PENDULUM METHOD: This method is basically a combination of horizontal swinging of a pendulum 50 and a purely vertical oscillation on a vertical test stand, as is shown in FIG. 3. There, a steel wire cord 54 connects the buoy 52 with a counterbalance weight 56 around a drum 58 attached to the pendulum bar. The counterbalance weight 56 has a pointer attached to it 60 which shows the amplitude on a scale 62. The amplitude of the sinusoidal motion induced to the Waverider buoy 52 is controlled by the amplitude of motion imparted to the swinging pendulum 50. The frequency of oscillation can be increased or decreased by shortening or lengthening the distance between the pendulum weights and the oscillation pivot, or by simply reducing or increasing the weight of the pendulum. The method is fairly accurate provided the weight used for the pendulum is heavy enough, however, there are also the following disadvantages:

(a) The motion produced by a swinging pendulum 50 exhibits aproximate sinusoidal motion only for small oscillation amplitudes of the pendulum 50. Therefore, the amplitudes induced to the Waverider buoy 52 are also small.

(b) In order to change the frequency of oscillation either the weight 50 of the pendulum, or its length, or both must be varied. If the weight 50 of the pendulum is too light, then the motion induced to the Waverider buoy 52 is not sinusoidal, and if its length is too short then the amplitude of motion induced to the buoy is too small as was pointed out in (a) above.

(c) If larger amplitudes of sinusoidal motion are desired, then it would be necessary to build an unrealistically large apparatus, thus cost, physical space and other problems would arise.

(d) The vertical oscillations induced to the Waverider buoy 52 are in reality damped sinusoidal since the pendulum's amplitude is reduced at each stroke; thus it is necessary for a person to continually give the pendulum 50 a push in order to maintain an approximately constant pendulum amplitude.

This method can also be combined with the springs method by connecting with springs the Waverider buoy 52 and the counterbalance weights 56 to the ground.

4. VERTICAL ROTATING ARM METHOD: This method consists in placing the buoy 64 on a vertical rotating arm 68. The arm rotates about a fixed point, therefore the buoy 64 describes a circular path. Since the accelerometer inside the buoy 64 only reacts to vertical displacements, the motion that the accelerometer actually sees is a sinusoidal or simple harmonic.

FIG. 4 shows the test apparatus. There the rotating arm 68 may be set in motion by an electric motor or variable angular velocity. The high RPM of the electric motor is reduced to 2 to 25 RPM by a system of timing belts which connect the motor to the rotating arm 68. The Waverider buoy 64 is kept in its upright position by a combination of gears and chains. There is a counterbalance weight 66 at the arm end opposite to where the Waverider buoy 64 is fixed. The amplitude of the sinusoidal motion induced to the buoy 64 can be either 1, 2 or 3 meters. This method is accurate, since the amplitude of motion can be exactly measured, and the frequency can be precisely controlled, however, this method also presents the following disadvantages:

(a) There is no known test apparatus built for testing 6900 series Waverider buoys. The only one built are for testing strictly 6000 series waverider buoys which are of smaller size and weight. (b) Changing the amplitude takes about one day as it is necessary to reposition the buoy mounting and also reposition the counterbalance weights 66.

(c) The amplitude settings are limited to either 1, 2 or 3 meters.

(d) There is a limitation on the maximum angular velocity that can be induced to the Waverider buoy 64 since it is required for the horizontal acceleration to stay well below 0.5 g.

(e) The actual physical space taken up by the apparatus is large. For larger amplitudes, an even larger apparatus would be required.

(f) Needs to be well anchored since an improper balance between Waverider buoy 64 and the counterbalance weight 66 could cause serious problems at larger angular velocities.

SUMMARY OF THE INVENTION

Accordingly, it is an object of the present invention to obviate these problems of the prior art.

It is another object of the present invention to provide for improved wave measurement accuracy.

It is another object to provide an improved apparatus for use in the calibration of a waverider buoy accelerometer.

It is another object of the present invention to provide such an apparatus with which Waverider buoys of different diameters and weights can betested.

It is another object of the present invention to provide such an apparatus with which the amplitude of induced sinusoidal motion can be varied to any size in a reasonably short length of time without the need to disassemble any part of the apparatus.

It is a further object of the present invention to provide such an apparatus with which sinusoidal motion on the waverider buoy accelerometer can be induced without a centrifugal force component.

Still another object of the present invention is to provide such an apparatus which is inexpensive to manufacture and is portable.

The device in accordance with the present invention, which achieves these objectives, contains a rotatable disk or arm and a bearing, which is fixed onto the disk or arm and also engages a slot in a rigid member, causing the rigid member to exhibit reciprocating rectilinear sinusoidal or simple harmonic motion when the rotatable disk or arm rotates.

A rack is fixed onto the rigid member, which rack also exhibits reciprocating rectilinear sinusoidal motion. Two rollers force the rack onto a pinion so that reciprocating sinusoidal motion is also transmitted to this pinion which exhibits reciprocating curvilinear sinusoidal motion. This pinion at the same time transmits the reciprocating sinusoidal motion to a driver pinion by means of an axle. Finally, the driver pinion transmits the reciprocating curvilinear sinusoidal motion to a chain which exhibits reciprocating rectilinear sinusoidal motion and is in a closed loop with the waverider buoy and a counterbalance weight.

For a better understanding of the present invention, a possible embodiment thereof will now be described with reference to the attached drawings, it being understood that this embodiment is to be intended as merely exemplary and in no way limitative.

DETAILED DESCRIPTION OF PREFERRED EMBODIMENT

Figure 5:
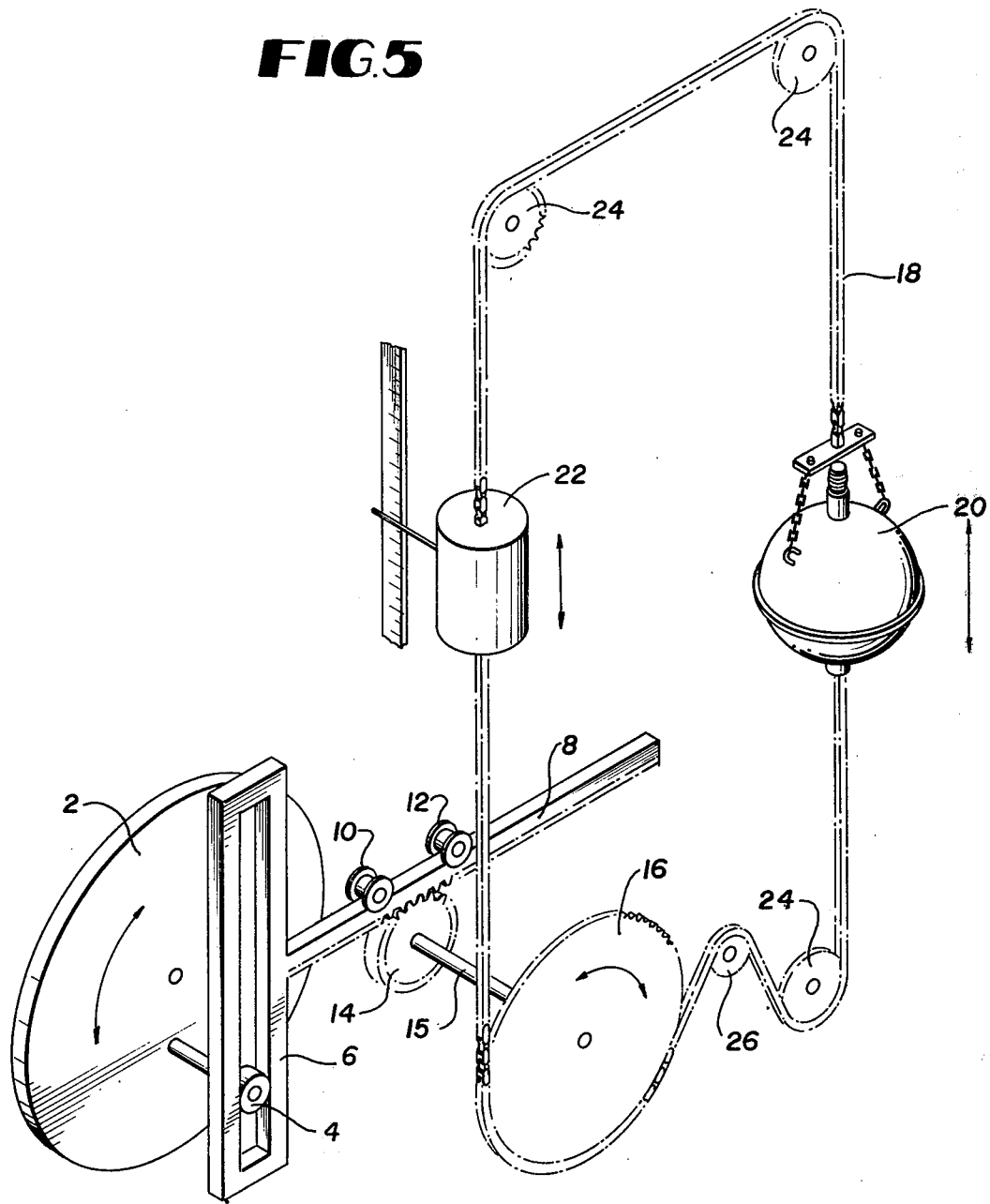
FIG. 5 is a schematic perspective view of the present invention.

FIG. 5 shows the basic design of an embodiment of the apparatus of the present invention that induces a sinusoidal or simple harmonic motion upon a buoy with the objective of detecting whether the signals given by an accelerometer which is within the buoy will reproduce the induced sinusoidal motion. If the signals given by the accelerometer are distorted, i.e. they do not reproduce the induced sinusoidal motion given to the buoy, then the acdelerometer must be calibrated.

In FIG. 5 a rotatable disk 2 has a roller 4 attached thereto. The roller 4 slidably engages a longitudinal slot in a rectangular rigid member 6. A rack 8 is fixedly connected to the rectangular rigid member 6. The rack 8 engages a pinion 14. Two rollers 10 and 12 force the rack onto the pinion 14 and together with pinion 14 constrain the rack 8 and rigid member 6 to move reciprocably only along a single rectilinear axis. Pinion 14 is connected by an axle 15 to a driver pinion chain gear 16. Driver pinion 16 engages an endless chain 18. Three pinions 24, in conjunction with driver pinion 16 engage the chain 18 and cause it to take a path around a closed loop having two vertical legs, disposed opposite one another. To one vertical leg of the chain 18 is connected a waverider buoy 20. To the opposite vertical leg of the chain 18 is connected a counterbalance weight 22. Another pinion 26 also engages the chain 18 in such a manner as to eliminate slack therein.

In operation, when the arm 2 is rotated, the roller 4 which is fixed onto disk 2 forces the rigid member 6 to exhibit reciprocating rectilinear sinusoidal or simple harmonic motion in the manner of a scotch yoke mechanism. A rack 8 is integrally fixed onto the rigid member 6, and thus also presents a reciprocating rectilinear sinusoidal motion. The reciprocating rectilinear sinusoidal motion is transmitted to pinion 14 by its engagement with rack 8, so that the pinion 14 exhibits reciprocating curvilinear sinusoidal motion. This pinion 14 at the same time transmits the reciprocating curvilinear sinusoidal motion to driver pinion 16 by means of axle 15 or any other component which does not permit relative motion between pinion 14 and pinion 16. Finally, pinion 16 transmits the reciprocating curvilinear sinusoidal motion to chain 18 which is in a closed loop with the waverider buoy 20 and the counterbalance weight 22 (which is optional, by strongly suggested from the dynamic point of view). The waverider buoy accelerometer (not shown) is contained within the buoy 20. Those legs of the chain 18 which are straight, exhibit reciprocating rectilinear sinusoidal motion. The waverider buoy 20 is attached to a vertical straight leg of the chain and thus rides up and down in a reciprocating sinusoidal motion, of predetermined amplitude and frequency, thereby simulating wave motion. The pinions 24 are used in order to insure that the buoy 20 and the counterweight 22 will move vertically. The pinion 26 provides the proper tension to chain 18.

Figure 1:
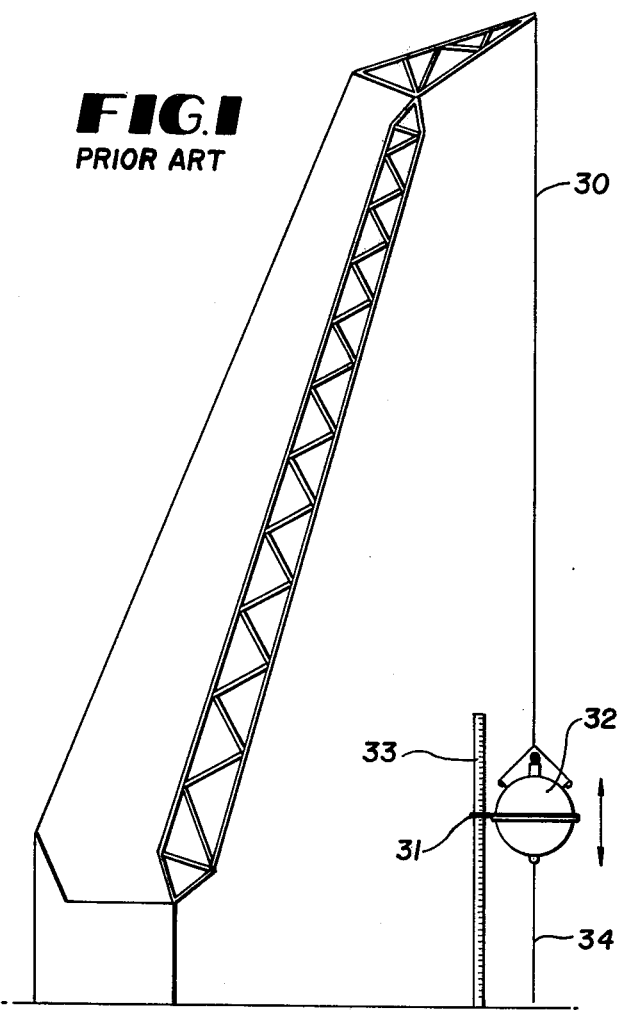
FIG. 1 is a schematic side elevational view of a method, known in the prior art, of testing the calibration of wave rider buoy accelerometers.
Figure 2:
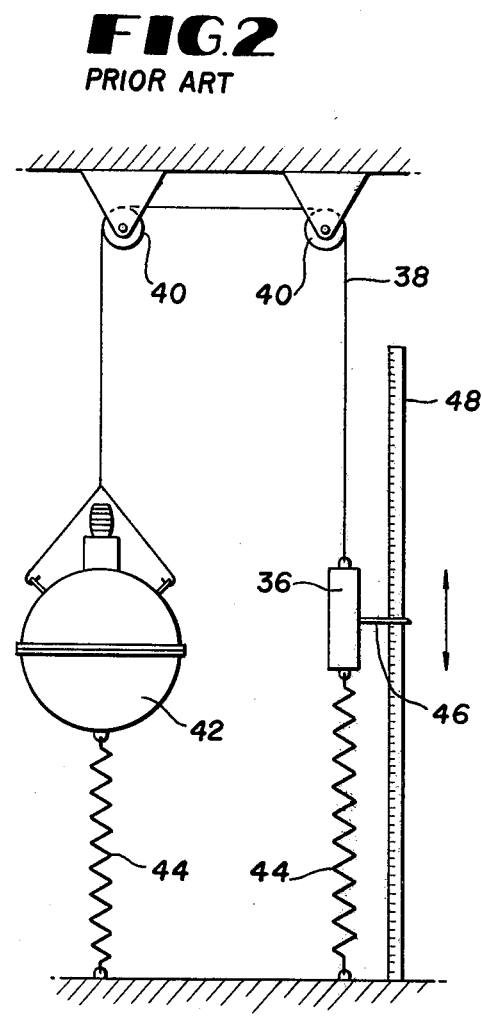
FIG. 2 is a side schematic elevational view of another method, known in the prior art, of testing the calibration of waverider buoy accelerometers.
Figure 6A:
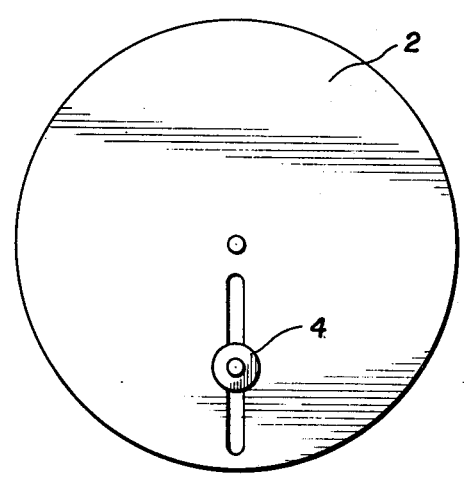
FIG. 6A is a front elevation view of the rotatable disk of the present invention.
Figure 6B:
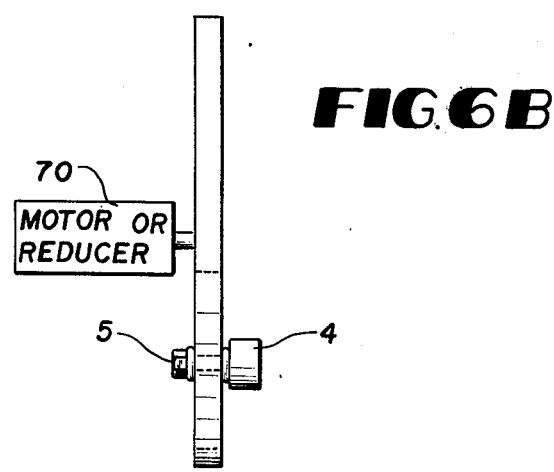
FIG. 6B is a side elevational view of the rotatable disk of the present invention.
Figure 3:
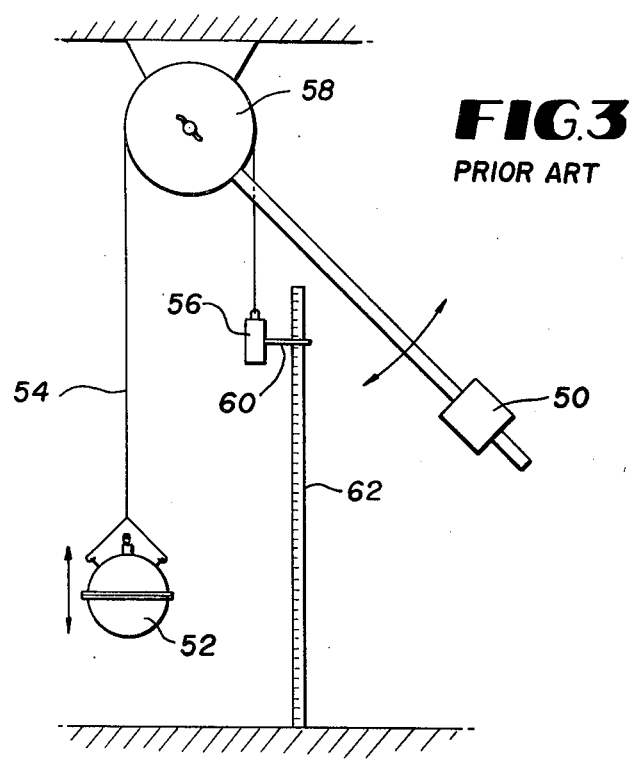
FIGS. 3 and 4 is a side schematic elevational view of another method, known in the prior art, of testing the calibration of waverider buoy accelerometers.
Figure 4:
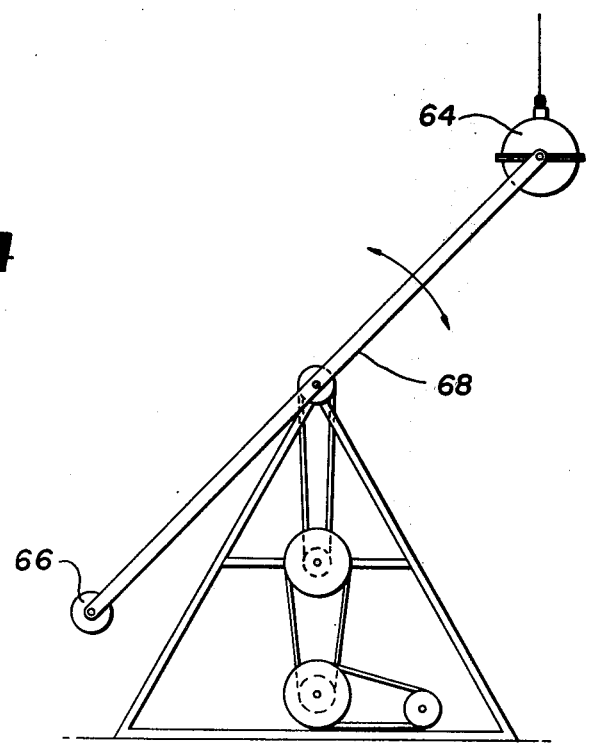

The period (or frequency) of the sinusoidal motion can be simply varied by changing the angular velocity of the disk 2. This disk 2 may be connected directly or indirectly to an electric motor 70 FIG. 6B which permits the change of its angular velocity by means of a controller (not shown). In order to change the amplitude of the sinusoidal motion induced upon the waverider buoy 20, the position of the roller 4 is simply adjusted. The position of roller 4 is generally fixed by a nut 5 as indicated in FIG. 6B. The distance from roller 4 to the point of rotation of disk 2 will determine the amplitude of the sinusoidal motion induced upon the waverider buoy 20.

The waverider buoy 20 may be attached to the chain 18, in any manner known to those skilled in the art, so long as the acelerometer contained in the buoy can be accurately calibrated.

The advantages of this new apparatus compared with the existing apparatus are as follows:

(1) Since the buoy 20 moves only in the vertical direction, there is no centrifugal or any other horizontal force component acting upon the accelerometer, therefore the signals given by the accelerometer are expected to be accurate.

(2) The horizontal component of motion acting upon the structure of the apparatus is very small, therefore it is not required that the structure be anchored, i.e. it is portable.

(3) In order to vary the amplitude of the sinusoidal or simple harmonic motion, it is only necessary to change the position of roller 4 without the need to disassemble any part of the apparatus or its structure.

(4) Since the buoy 20 only moves in the vertical direction, the dimension of width of the apparatus and its structure is reduced considerably.

(5) Different size waverider buoys and other equipment may be tested on the apparatus.

(6) The total cost of the apparatus is relatively low, since most of the parts used in its construction are readily available.

It will be obvious to those skilled in the art that various changes may be made without departing from the scope of the invention, and the invention is not to be considered limited to what is shown in the drawings and described in the specification.

What is claimed is:

1. An apparatus for testing the calibration of a waverider buoy accelerometer, comprising:
   a rotatable member, rotatable about an axis perpendicular to the longitudinal axis of said rotatable member;
   a rectilinearly reciprocable member comprising a chain disposed in a closed loop having too oppositely disposed vertical legs;
   a first translating means, engaging said rotatable member and said rectilinearly reciprocable member, for translating the rotational motion of said rotatable member into vertical reciprocating rectilinear sinusoidal motion by the vertical legs of said rectilinearly reciprocable member; and
   a waverider buoy attaching means, connected to one of the vertical legs of said rectilinearly reciprocable member, for attaching said waverider buoy to said rectilinearly reciprocable member, whereby, when the apparatus is in use, said waverider buoy is subjected to a vertical reciprocating rectilinear sinusoidal motion of known degree.

2. An apparatus for testing the calibration of a waverider buoy accelerometer, in accordance with claim 1, wherein said first translating means comprises:
   a first rigid member slidably connected to said rotatable member in such a manner that said first rigid member is constrained to exhibit corresponding reciprocating rectilinear motion;
   second translating means, engaging said first rigid member and including a pinion gear, for translating the reciprocating rectilinear motion of said first rigid member into corresponding reciprocating curvilinear motion of said pinion gear; and
   third translating means, engaging said second translating means, for translating the reciprocating curvilinear motion of said pinion gear into vertical reciprocating rectilinear motion by the vertical legs of said rectilinearly reciprocating member.

3. An apparatus for testing the calibration of a waverider buoy accelerometer, in accordance with claim 2, wherein said first translating means further includes:
   a forcing means for forcing said first rigid member to engage said second translating means.

4. An apparatus for testing the calibration of a waverider buoy accelerometer, in accordance with claim 2, wherein said rotatable member comprises:
   a rotatable disk or arm;
   a roller, adjustably connected to said arm; and
   adjusting means for permitting the position of said roller along said disk or arm to be changed.

5. An apparatus for testing the calibration of a waverider buoy accelerometer, in accordance with claim 4, wherein said first rigid member comprises:

a member with a longitudinal slot therein in engagement with said roller; and a rack fixedly connected to said member and constrained to move only rectilinearly along a single axis.

6. An apparatus for testing the calibration of a waverider buoy accelerometer, in accordance with claim 5, wherein said second transmitting means comprises a first pinion which engages said rack, and wherein said third translating means comprises a second pinion or chain gear engaging said rectilinearly reciprocable member, and an axle rigidly connecting said first pinion and said second pinion.

7. An apparatus for testing the calibration of a waverider buoy accelerometer, in accordance with claim 1, further including a counter-balance weight attached to the vertical leg of said chain opposite that leg to which said waverider buoy attaching means is connected.

* * * * *